（12）United States Patent
Shiba

(10) Patent No.: US 7,150,074 B2
(45) Date of Patent: Dec. 19, 2006

(54) HINGE FOR PORTABLE TERMINAL

(75) Inventor: Tsuyoshi Shiba, Kanagawa (JP)

(73) Assignee: Katoh Electrical Machinery Co. Ltd., Kanagawa (JP)

( * ) Notice: Subject to any disclaimer, the term of this patent is extended or adjusted under 35 U.S.C. 154(b) by 80 days.

(21) Appl. No.: 10/903,354

(22) Filed: Jul. 30, 2004

(65) Prior Publication Data
US 2005/0050687 A1 Mar. 10, 2005

(30) Foreign Application Priority Data
Aug. 4, 2003 (JP) .............................. 2003-286283

(51) Int. Cl.
E05D 3/10 (2006.01)
(52) U.S. Cl. ........................................ 16/367; 16/330
(58) Field of Classification Search .................. 16/366, 16/367, 330, 303; 361/680–683; 455/575.1, 455/575.4, 575.8, 550.1, 90.3; 379/433.12, 379/433.13; 348/373, 333.06; 248/919–923
See application file for complete search history.

(56) References Cited

U.S. PATENT DOCUMENTS

| | | | | |
|---|---|---|---|---|
| 6,256,837 B1 * | 7/2001 | Lan et al. ...................... 16/334 |
| 2003/0040288 A1 * | 2/2003 | Kang et al. ..................... 455/90 |
| 2004/0012920 A1 * | 1/2004 | Tanimoto et al. ............ 361/683 |
| 2004/0200038 A1 * | 10/2004 | Kim .............................. 16/367 |
| 2005/0005401 A1 * | 1/2005 | Bae .............................. 16/374 |
| 2005/0119023 A1 * | 6/2005 | Sudo et al. ............... 455/550.1 |
| 2005/0198779 A1 * | 9/2005 | Jung et al. ..................... 16/367 |

FOREIGN PATENT DOCUMENTS

JP 11112846 A * 4/1999
WO WO 2004109131 A1 * 12/2004

* cited by examiner

Primary Examiner—Chuck Y. Mah
(74) Attorney, Agent, or Firm—Notaro & Michalos P.C.

(57) ABSTRACT

A hinge for portable terminal that not only has both functions of allowing a second casing to open/close relative to a first casing and allowing the second casing to turn relative to the first casing in a direction right angle to the opening/closing direction, but also is capable of preventing external leakage of a lubricating oil and is formed to be as compact as possible. The hinge includes: a rotary hinge module; and an opening/closing hinge module wherein: the rotary hinge module has a fixed member attached to the first casing and a cylindrical rotary member attached to the fixed member with a turn thereof being controlled via a first cam mechanism; the opening/closing hinge module is provided in the cylindrical rotary member and has an opening/closing member which is rotatably mounted with a rotation thereof being controlled to be in a right angle direction to a direction of the turn of the rotary hinge module via a second cam mechanism and to which an end portion of the second casing is coupled; and the rotary hinge module operates from an instant when the opening/closing hinge module reaches a predetermined angle.

11 Claims, 35 Drawing Sheets

HINGE FOR PORTABLE TERMINAL

BACKGROUND OF THE INVENTION

1. Field of the Invention

The present invention relates to a hinge for portable terminal suitable for use in portable terminals such as a cellular phone, a PHS, and a personal digital assistance (PDA).

2. Description of the Related Art

In recent years, the function and performance of portable terminals are getting remarkably higher and the portable terminals are becoming more compact. Among them, as for a cellular phone, a PHS, and the like, in moduleicular, the following structure is becoming on the mainstream in order to realize when not in use the compact size, the protection of a display portion, and further, the prevention of the malfunction of a keyboard portion. That is, a first casing having the keyboard portion and a microphone thereon and a second casing having the display portion, a speaker, and a camera thereon are foldable via a hinge, with the keyboard portion and the display portion facing each other. In such a cellular phone, PHS, or the like, the display portion is formed to be vertically long so as to have a slim shape. However, now that the portable terminals are additionally equipped with various functions, for example, a downloaded movie display function and a television image display function, such a vertically long display portion is in some cases poor in visibility for those who are used to viewing a laterally long screen such as a screen of a television, a movie, a personal computer, or the like. Moreover, there has also arisen a problem such that, when information originally assumed to be displayed on a laterally long display portion is transmitted or inputted to a portable terminal having such a vertically long display portion, the information cannot be completely displayed thereon.

This has given rise to a need for a hinge that not only foldably couples the second casing to the first casing, but also allows the second casing to turn relative to the first casing in a direction right angle to an opening/closing direction when it is at a predetermined opening/closing position.

As a hinge having such a function, that described in Japanese Patent Application Laid-open No. 2003-69676 is known.

The hinge described in this patent application publication is structured such that a circulation spindle module of a rotary hinge module that is pivotally attached to a bottom of a first casing is bent to be led to an upper end side of a second casing and an opening/closing hinge module coupled to the second casing is attached to an upper end portion of the circulation spindle module. This structure has such a problem that a lubricating oil especially in the rotary hinge module leaks outside to stain hands and clothes, and in addition, the structure of the entire hinge becomes large to occupy a large mounting space, which hinders the downsizing of the portable terminal.

SUMMARY OF THE INVENTION

It is an object of the present invention to provide, in a portable terminal such as a cellular phone, especially of a foldable type, a hinge for portable terminal which not only has both functions of allowing a second casing having a display portion thereon to open/close relative to a first casing having a keyboard portion thereon and of allowing the second casing to turn relative to the first casing in a direction right angle to a direction of the opening/closing, but also is capable of preventing a lubricating oil from leaking outside and is formed as compact as possible so that a mounting space can be saved.

In order to achieve the object stated above, the present invention includes: a rotary hinge module attached to an upper face side of a first casing having a keyboard portion thereon; and an opening/closing hinge module which is provided in the rotary hinge module and to which the second casing having a display portion is coupled to be openable/closable relative to the first casing, wherein: the rotary hinge module has a fixed member attached to the first casing and a cylindrical rotary member attached to the fixed member with a turn thereof being controlled via a first cam mechanism; the opening/closing hinge module is provided in the cylindrical rotary member and has an opening/closing member which is rotatably mounted with a rotation thereof being controlled to be in a right angle direction to a direction of the turn of the rotary hinge module via a second cam mechanism and to which an end portion of the second casing is coupled; and the rotary hinge module operates from an instant when the opening/closing hinge module is opened to a predetermined angle.

The above-described invention may also be structured such that at least one of the first cam mechanism and the second cam mechanism has an absorbing function, the absorbing function of the first cam mechanism being a function of automatically turning the cylindrical rotary member from a predetermined turn angle, and the absorbing function of the second cam mechanism being a function of automatically opening/closing the opening/closing member from a predetermined opening/closing angle.

The above-described invention may also be structured such that the opening/closing member is a hinge cylinder.

The above-described invention may further include a means for allowing the rotary hinge module to operate from the instant when the opening/closing hinge module is opened to the predetermined angle, the means being provided between the opening/closing member of the opening/closing hinge module and the fixed member of the rotary hinge module.

The above-described invention may be structured such that each of the first cam mechanism and the second cam mechanism is constituted of a cam and a cam floor in which cam portions are formed on respective facing surfaces thereof, one of the cam portions being in pressure contact with the other cam portion.

The above-described structure of the present invention can bring about the following effects. It is possible to prevent a screen from being scratched as much as possible when not in use since a face of the second casing where a display portion and a camera are provided is positioned on a lower side while the second casing is folded relative to the first casing. In addition, the second casing is allowed to open/close in the vertical direction by the opening/closing hinge module and is turnable in the direction right angle to the opening/closing direction in the opened state, which allows the use of the display portion in a laterally long state.

DETAILED DESCRIPTION OF THE PREFERRED EMBODIMENTS

Figure 1:
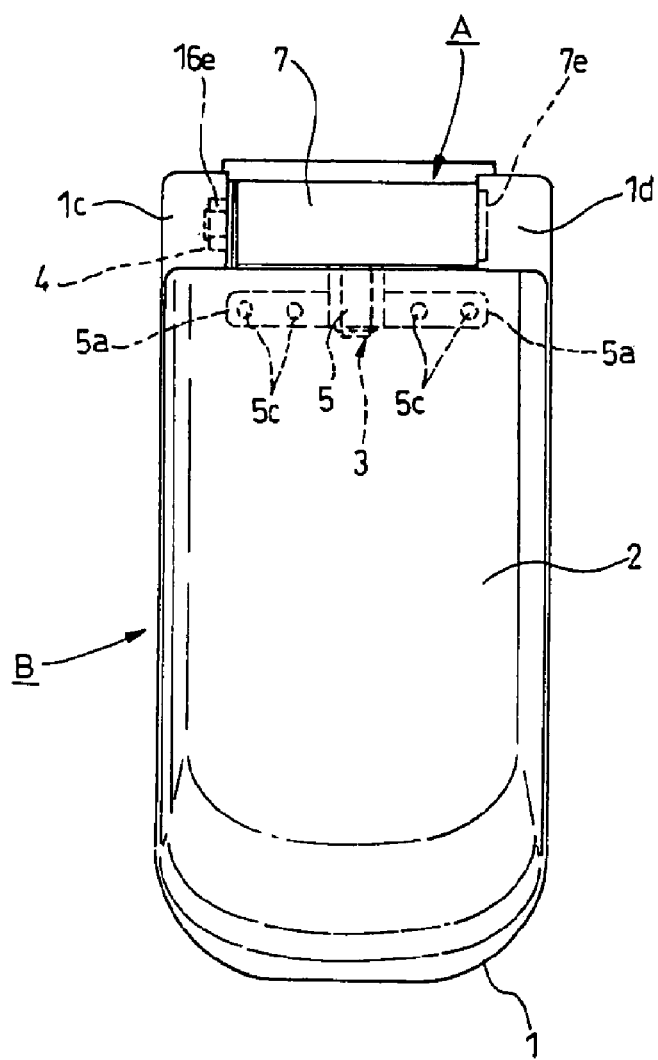
FIG. 1 is a plane view of a cellular phone in which the hinge for portable terminal according to the present invention is embodied, showing the state when a first casing and a second casing are folded.
Figure 2:
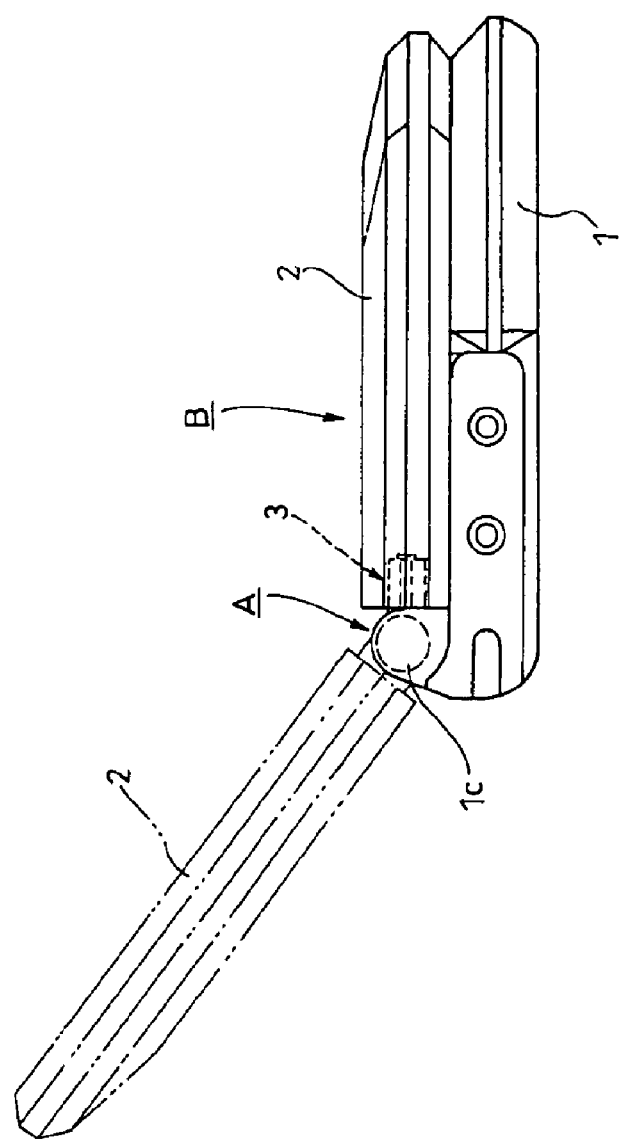
FIG. 2 is a right side view of the cellular phone in which the hinge for portable terminal according to the present invention is embodied, showing the state when the first casing and the second casing are folded.

FIG. 1 to FIG. 4 show a cellular phone B of a foldable type which is a kind of a portable terminal using a hinge A for portable terminal according to the present invention. The reference numeral 1 denotes a first casing having a keyboard portion 1a and a microphone 1b thereon, and the reference numeral 2 denotes a second casing having a display portion 2a, a speaker 2b, and a camera 2c thereon. The first casing 1 and the second casing 2 are coupled to each other at respective ends thereof via the hinge A for portable terminal to be turnable and openable/closable relative to each other.

This hinge A for portable terminal is composed of a rotary hinge module 3 and an opening/closing hinge module 4. The rotary hinge module 3 is attached to an upper face of the end portion of the first casing 1. The opening/closing hinge module 4 is attached to the rotary hinge module 3 to be openable/closable in a vertical direction which is a direction right angle to the rotary hinge module 3. The second casing 2 is attached to the opening/closing hinge module 4 to be openable and closable.

As shown especially in FIG. 1 to FIG. 10, the rotary hinge module 3, out of these components, is composed of a fixed member 5 and a cylindrical rotary member 7. The fixed member 5 has right and left mounting pieces 5a, 5a attached to the end portion of the second casing 2 with fixing screws 5c, 5c . . . and has a pivotally supporting cylinder 5b. The cylindrical rotary member 7 is turnably attached to the fixed member 5 via a first hinge pin 6. The first hinge pin 6 passes through a center portion of the pivotally supporting cylinder 5b in an axial direction and is rotatably mounted so as not to come off the pivotally supporting cylinder 5b in the axial direction, and a deformed head portion 6a thereof is fixed to a mounting seat 7a provided in the cylindrical rotary member 7 via a fixing screw 8. Note that the cylindrical rotary member 7 has a slit 7c through which a lead wire for electrical connection between the first casing 1 and the second casing 2 passes, as shown especially in FIG. 6.

Figure 9:
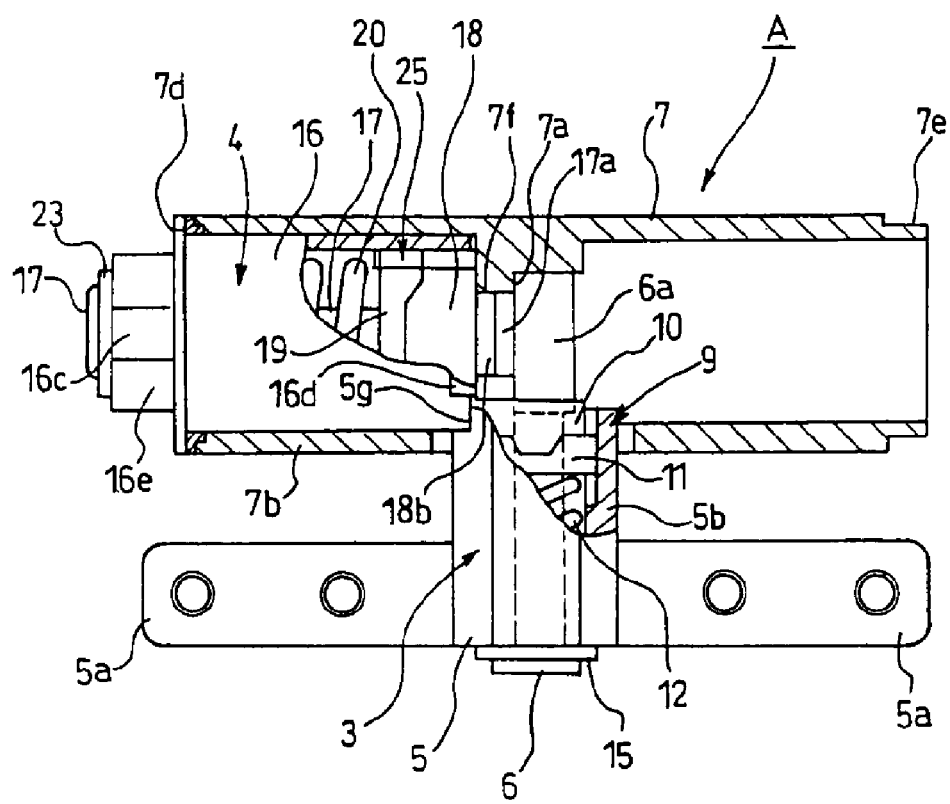
FIG. 9 is a module horizontal cross-sectional view showing an internal mechanism of the hinge for portable terminal according to the present invention.
Figure 10:
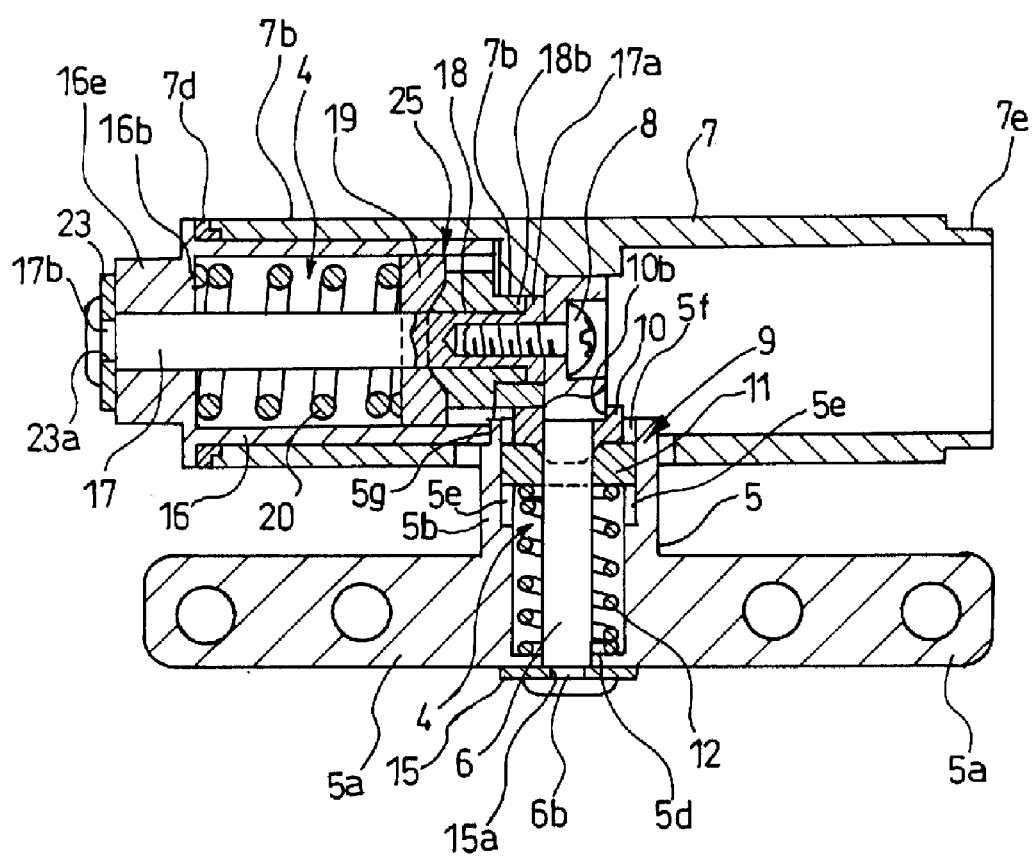
FIG. 10 is a horizontal cross-sectional view showing the internal mechanism of the hinge for portable terminal according to the present invention.

As shown especially in FIG. 9 and FIG. 10, the reference numeral 9 denotes a first cam mechanism of the rotary hinge module 3, and this first cam mechanism 9 is composed of: a first cam 10 which has at a center portion thereof an insertion hole 10a through which the first hinge pin 6 is rotatably inserted, the first hinge pin 6 restricting a rotation of the first cam 10; a first cam floor 11 facing the first cam 10, similarly having at a center portion thereof an insertion hole 11a through which the first hinge pin 6 is rotatably inserted, and being slidable in an axial direction with a rotation thereof being restricted by the pivotally supporting cylinder 5b; and a first resilient means 12 constituted of a compression spring which is coiled around the first hinge pin 6 to be resiliently interposed between an inner wall 5d of the pivotally supporting cylinder 5b and the first cam floor 11.

Figure 22:
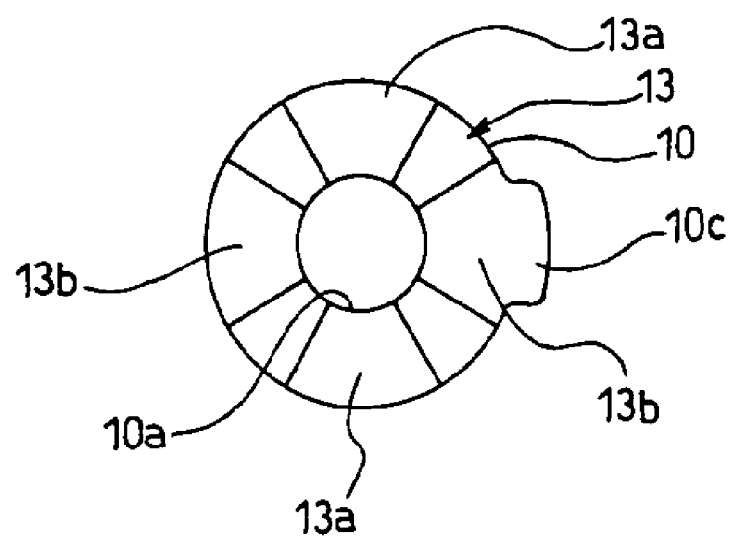
FIG. 22 is a right side view of the first cam shown in FIG. 20.
Figure 23:
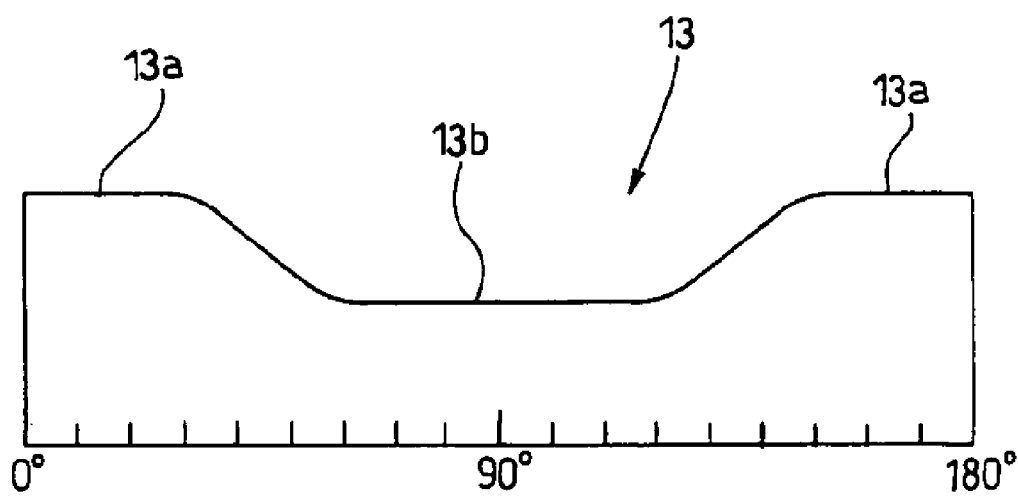
FIG. 23 is a developed view of the first cam shown in FIG. 20.
Figure 24:
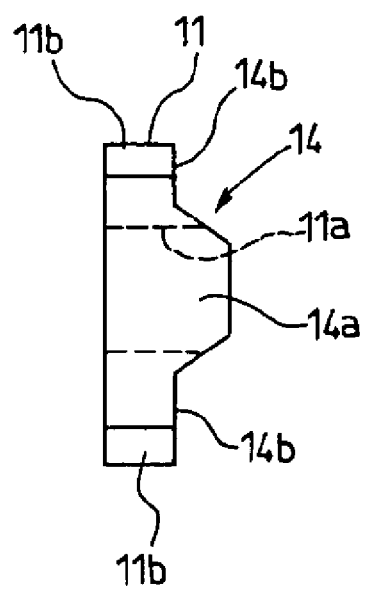
FIG. 24 is a front view of a first cam floor of the rotary hinge module of the hinge for portable terminal according to the present invention.
Figure 25:
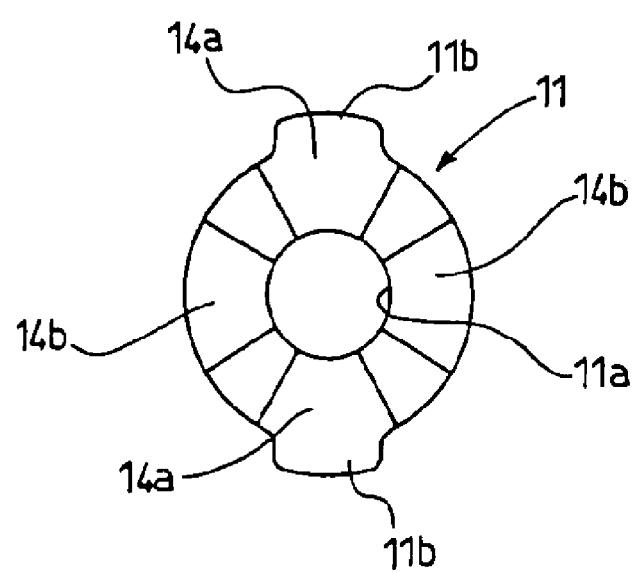
FIG. 25 is a right side view of the first cam floor shown in FIG. 24.
Figure 26:
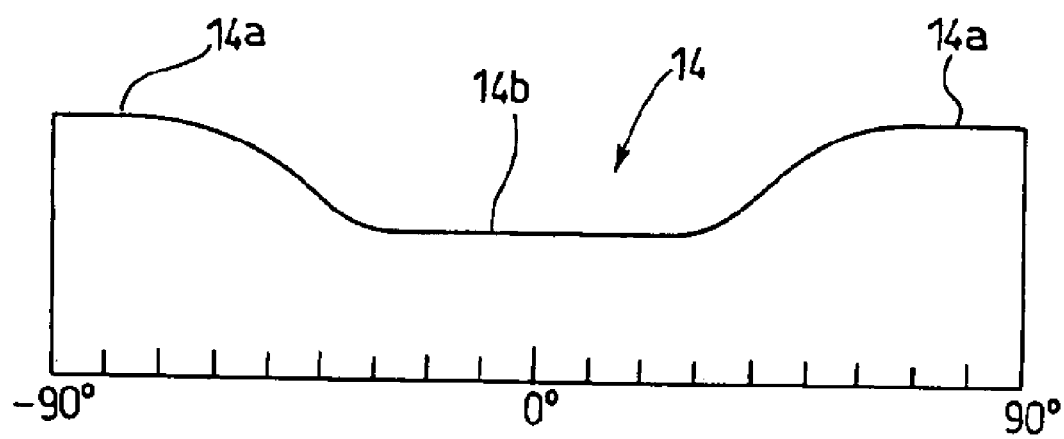
FIG. 26 is a developed view of a cam portion of the first cam floor shown in FIG. 24.
Figure 27:
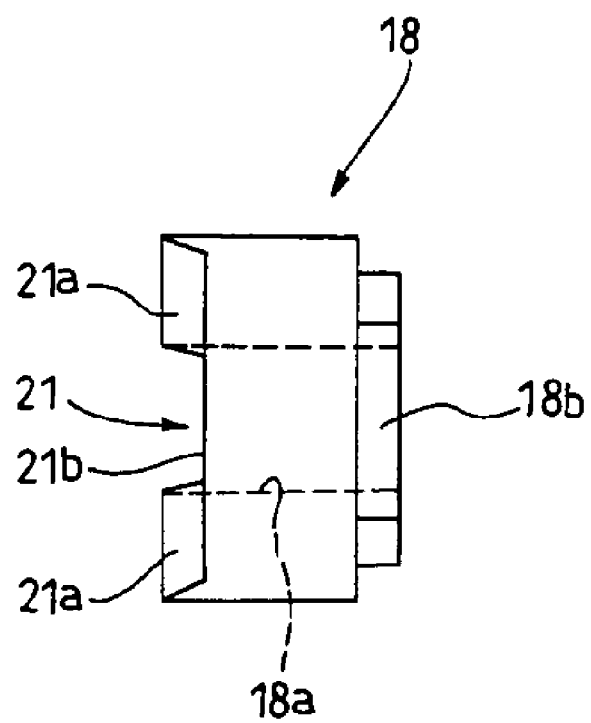
FIG. 27 is a front view of a second cam of the opening/closing hinge module of the hinge for portable terminal according to the present invention.
Figure 28:
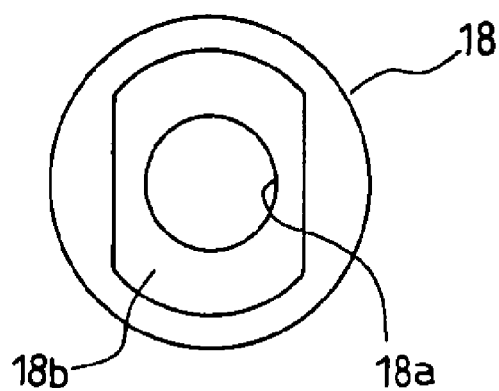
FIG. 28 is a right side view of the second cam shown in FIG. 27.
Figure 29:
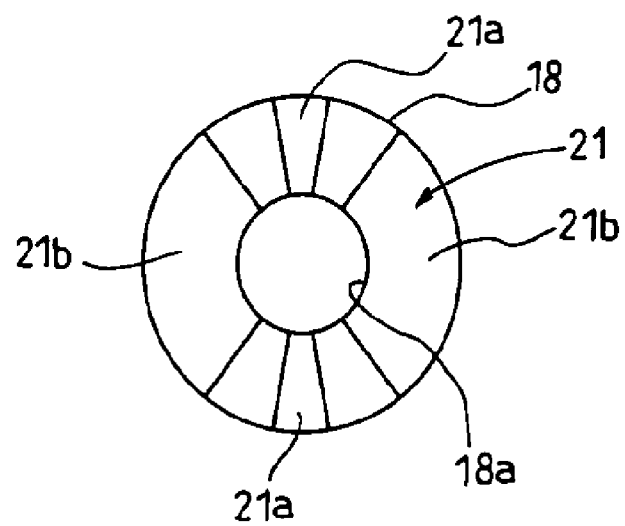
FIG. 29 is a left side view of the second cam shown in FIG. 27.

Here, a means for having the first cam 10 caught by the first hinge pin 6 is composed of a semicircular deformed hole 10b provided in the first cam 10 and a deformed head portion 6a of the first hinge pin 6 module of which is fitted in the deformed hole 10b, as shown especially in FIG. 10 and FIG. 19 to FIG. 21. Further, a means for having the first cam floor 11 caught by the pivotally supporting cylinder 5b is structured such that key portions 11b, 11b protruding from both side portions of the first cam floor 11 are fitted in key grooves 5e, 5e provided in the pivotally supporting cylinder 5b, as shown especially in FIG. 9 to FIG. 11, FIG. 25, and FIG. 26. Further, as shown especially in FIG. 21 and FIG. 22, a stopper portion 10c is protrudingly provided on one side of an outer periphery of the first cam 10, and this stopper portion 10c is fitted in a curved guide groove 5f provided in the pivotally supporting cylinder 5b shown especially in FIG. 11.

On mutually facing surfaces of the first cam 10 and the first cam floor 11, provided are cam portions 13, 14 formed of protruding portions 13a, 13a/14a, 14a and recessed portions 13b, 13b/14b, 14b, as shown in FIG. 20 to FIG. 24, and the cam portions 13, 14 are in pressure contact with each other as shown in FIG. 9 and FIG. 10. Note that, as shown in FIG. 5 to FIG. 10, the reference numeral 15 denotes a washer whose deformed hole 15a is fitted to a deformed shaft portion 6b provided at an end portion of the first hinge pin 6, and the end portion of the first hinge pin 6 is caulked, thereby restricting the axial-direction movement of the pivotally supporting cylinder 5b.

Figure 15:
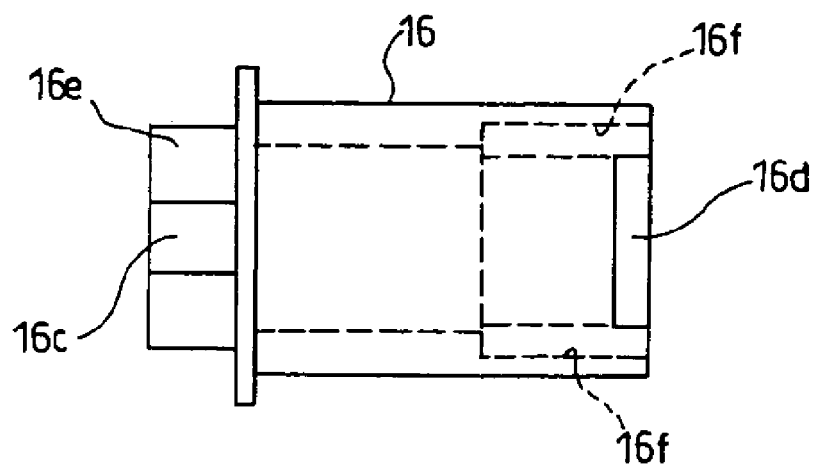
FIG. 15 is a plane view of an opening/closing member of an opening/closing hinge module of the hinge for portable terminal according to the present invention.
Figure 16:
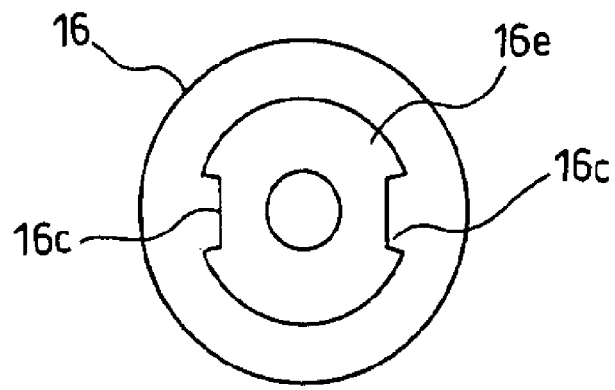
FIG. 16 is a left side view of the opening/closing member shown in FIG. 15.
Figure 17:
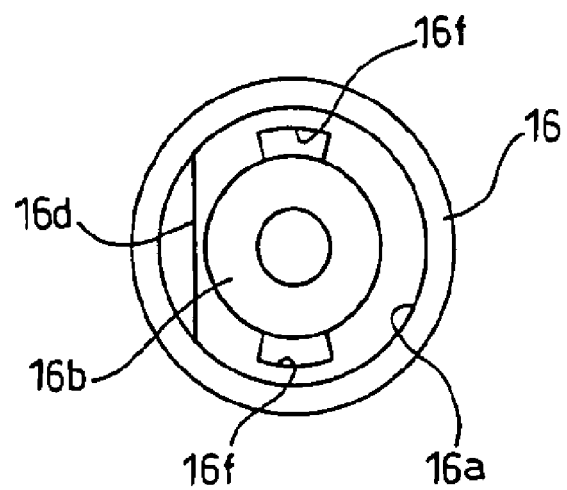
FIG. 17 is a right side view of the opening/closing member shown in FIG. 15.
Figure 18:
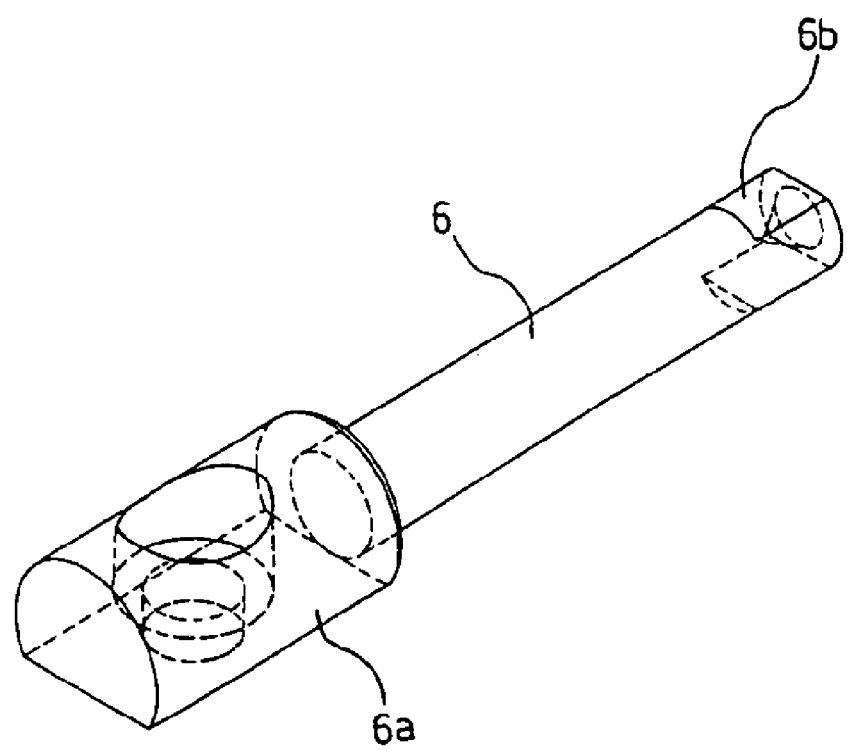
FIG. 18 is a perspective view of a first hinge pin of the rotary hinge module of the hinge for portable terminal according to the present invention.
Figure 19:
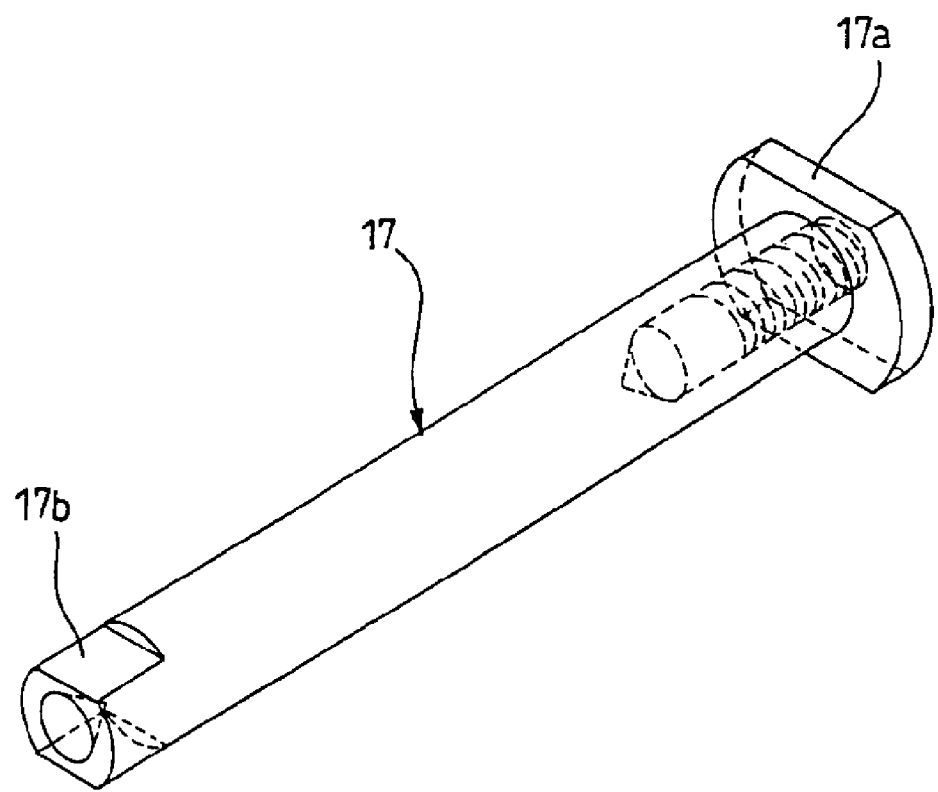
FIG. 19 is a perspective view of a second hinge pin of the opening/closing hinge module of the hinge for portable terminal according to the present invention.
Figure 20:
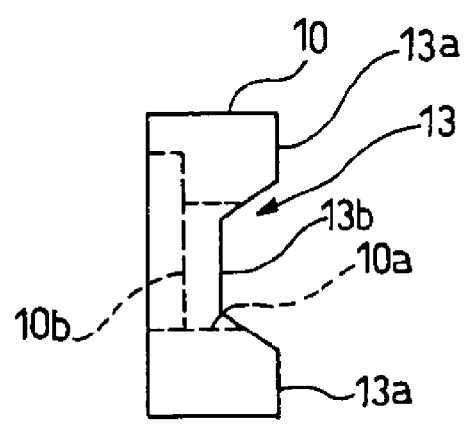
FIG. 20 is a front view of a first cam of the rotary hinge module of the hinge for portable terminal according to the present invention.
Figure 21:
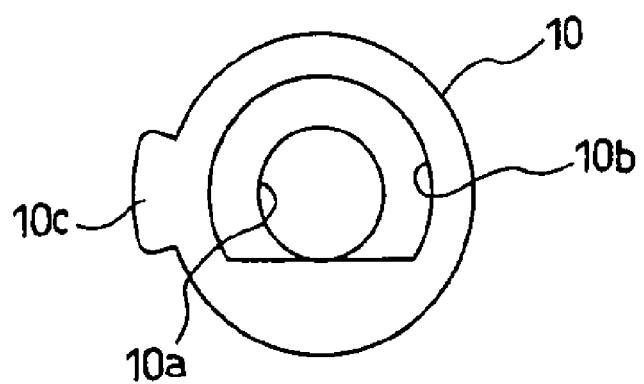
FIG. 21 is a left side view of the first cam shown in FIG. 20.
Figure 30:
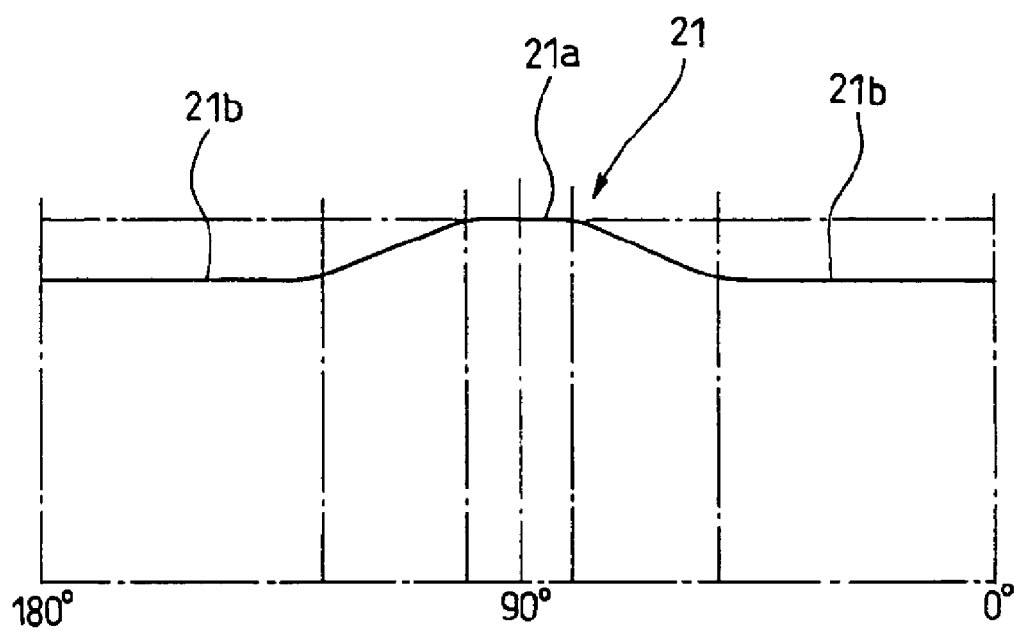
FIG. 30 is a developed view of a cam portion of the second cam shown in FIG. 27.
Figure 31:
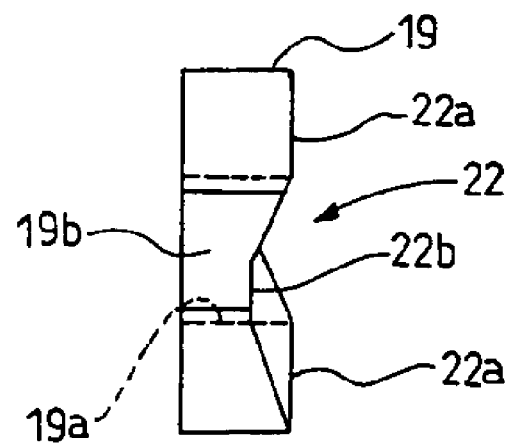
FIG. 31 is a front view of a second cam floor of the opening/closing hinge module of the hinge for portable terminal according to the present invention.
Figure 32:
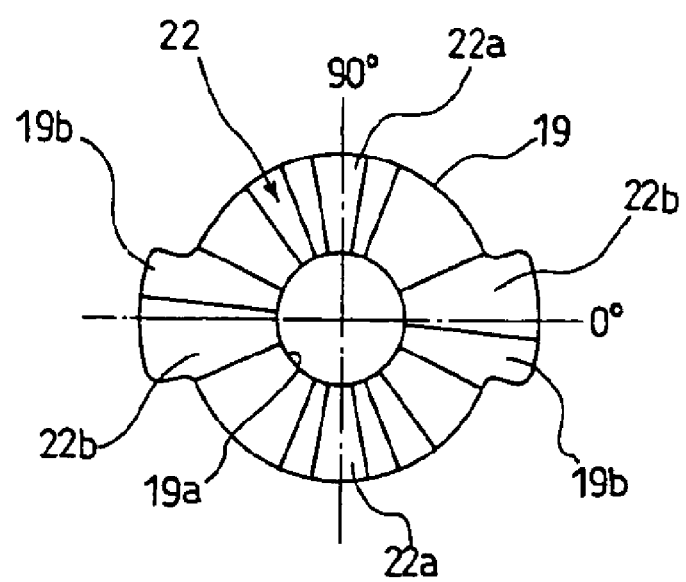
FIG. 32 is a right side view of the second cam floor shown in FIG. 31.
Figure 33:
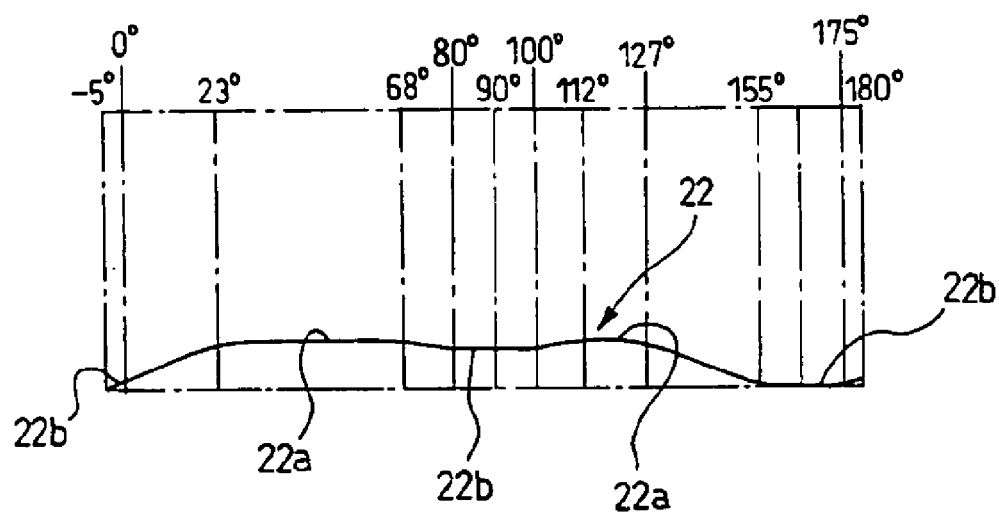
FIG. 33 is a developed view of a cam portion of the second cam floor shown in FIG. 31.

Next, as shown in FIG. 5 to FIG. 10, the opening/closing hinge module 4 includes: an opening/closing member 16 which is constituted of a hinge cylinder rotatably inserted in one side of a cylinder portion 7b of the cylindrical rotary member 7; a second hinge pin 17 passing through a center portion of the opening/closing member 16 in an axial direction with a deformed head portion 17a thereof (see FIG. 19) being fixedly inserted in a deformed hole 7f inside the cylindrical rotary member 7; a second cam 18 having at a center portion thereof an insertion hole 18a through which the second hinge pin 17 is rotatably inserted and having at a tail portion thereof a deformed protruding portion 18b which is fixedly inserted in the deformed hole 7f of the cylindrical rotary member 7 together with the deformed head portion 17a of the second hinge pin 17; a second cam floor 19 similarly having at a center portion thereof an insertion hole 19a which is formed in an axial direction and through which the second hinge pin 17 is inserted, and being slidable in the axial direction with a rotation thereof being restricted by the opening/closing member 16; and a second resilient means 20 constituted of a compression spring which is coiled around the second hinge pin 17 to be resiliently interposed between an inner wall 16b of the opening closing member 16 and the second cam floor 19. As shown in FIG. 9 and FIG. 10, the deformed head portion 6a of the first hinge pin 6 and the deformed head portion 17a of the second hinge pin 17 are fixed by fixing screw 8 in a right angle direction. Incidentally, a means for having the second cam floor 19 caught by the opening/closing member 16 is composed of a pair of key portions 19b, 19b protruding from an outer periphery of the second cam floor 19 as shown especially in FIG. 33 and key grooves 16f, 16f provided in the opening/closing member 16 so as to have the key portions 19b, 19b fitted therein as shown in FIG. 10, FIG. 15, and FIG. 17. A second cam mechanism 25 is formed of cam portions 21, 22 provided on mutually facing surfaces of the second cam 18 and the second cam floor 19. The cam portions 21, 22 are formed of protruding portions 21a, 21a/22a, 22a and recessed portions 21b, 21b/22b, 22b as shown in FIG. 30 and FIG. 31, and are in pressure contact with each other as shown in FIG. 9 and FIG. 10.

The reference numeral 23 in FIG. 5 to FIG. 10 denotes a washer. A deformed hole 23a provided in the axial direction in an center portion of the washer 23 is fitted to a deformed shaft portion 17b provided at an end portion of the second hinge pin 17 and the end portion is caulked, so that the opening/closing member 16 is locked so as not to come off the cylindrical rotary member 7.

As shown in FIG. 5 to FIG. 10 and FIG. 15 to FIG. 17, the opening/closing member 16 has turn stoppers 16c in a groove form at a portion thereof protruding from the cylindrical rotary member 7 and has a cutout portion 16d at an end portion thereof inserted in the cylindrical rotary member 7.

Figure 6:
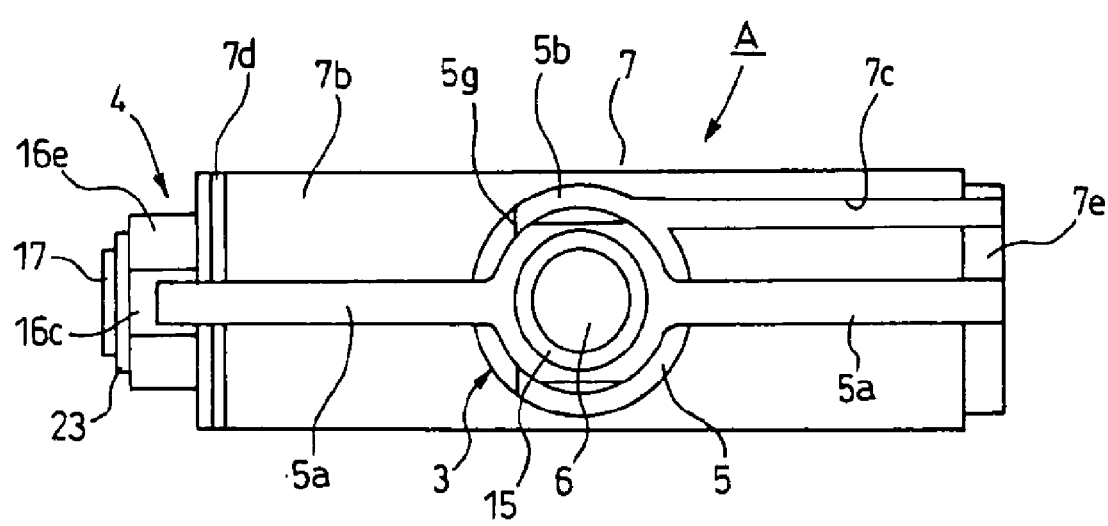
FIG. 6 is a front view of the hinge for portable terminal according to the present invention.
Figure 7:
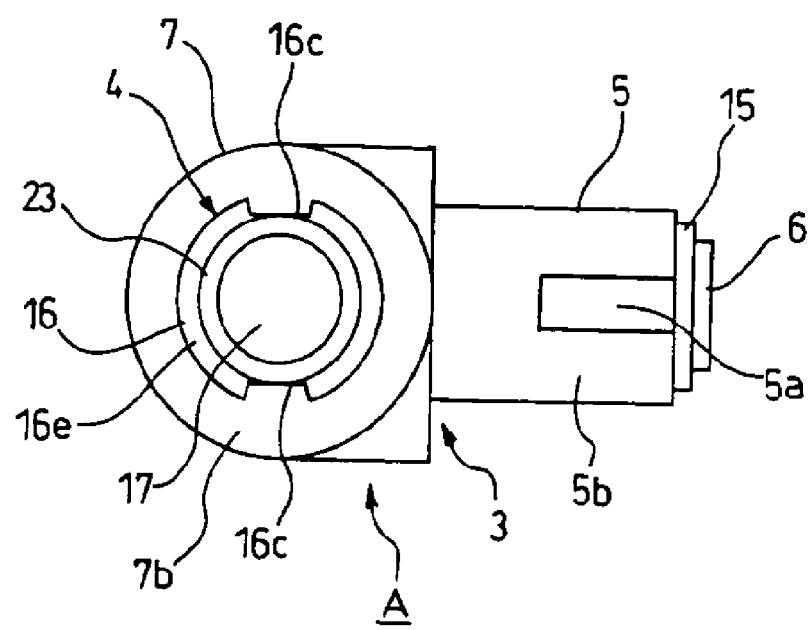
FIG. 7 is a left side view of the hinge for portable terminal according to the present invention.
Figure 8:
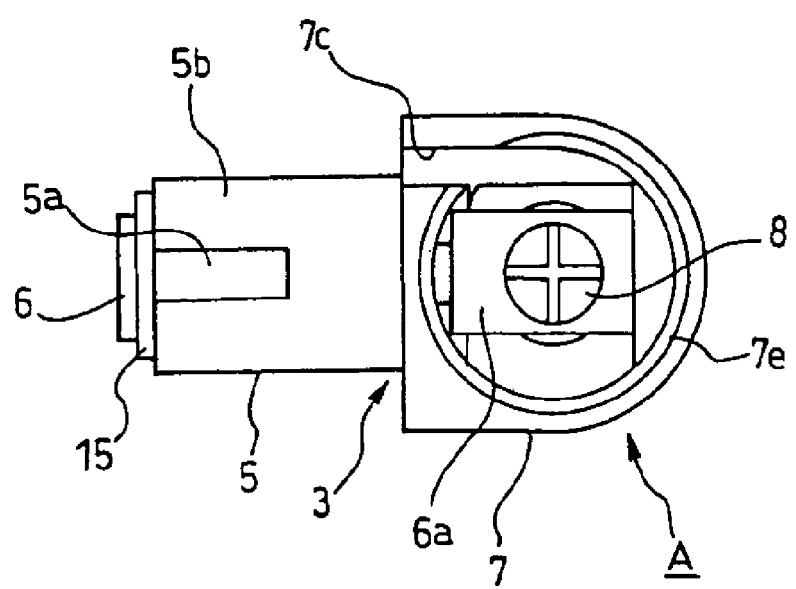
FIG. 8 is a right side view of the hinge for portable terminal according to the present invention.
Figure 11:
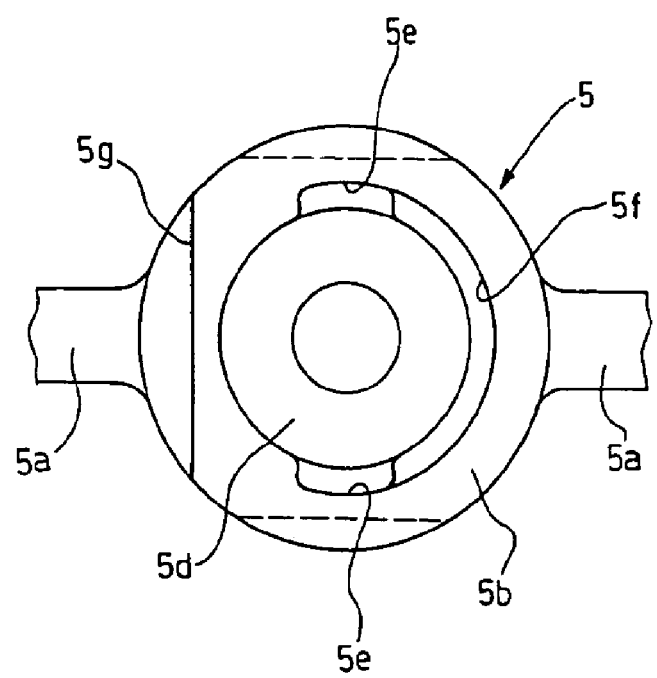
FIG. 11 is a module enlarged plane view of a fixed member of a rotary hinge module of the hinge for portable terminal according to the present invention.
Figure 12:
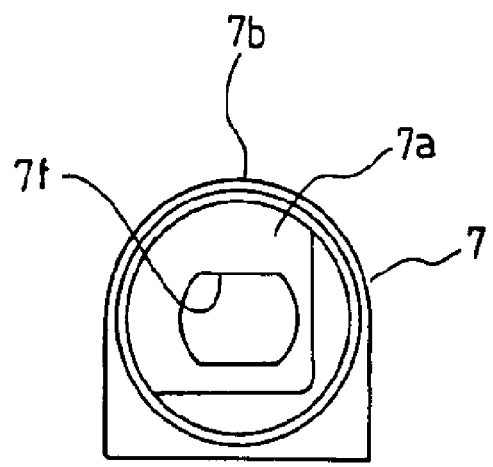
FIG. 12 is a left side view of a cylindrical rotary member of the rotary hinge module of the hinge for portable terminal according to the present invention.
Figure 13:
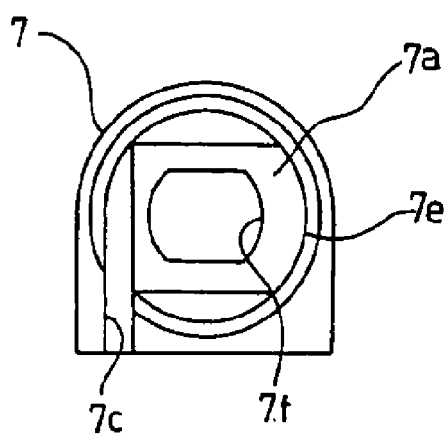
FIG. 13 is a right side view of the cylindrical rotary member of the rotary hinge module of the hinge for portable terminal according to the present invention.
Figure 14:
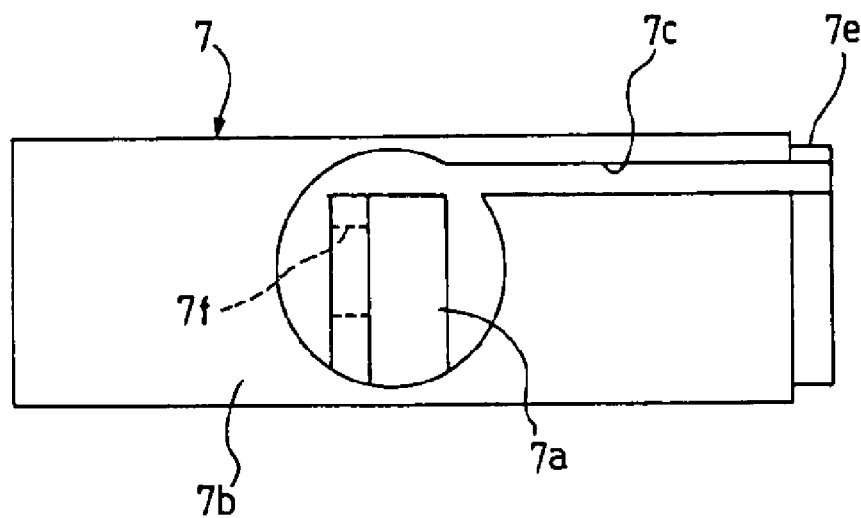
FIG. 14 is a bottom view of the cylindrical rotary member of the rotary hinge module of the hinge for portable terminal according to the present invention.

At an upper end portion of the fixed member 5 of the above-described rotary hinge module 3, a cutout portion 5g shown in FIG. 11 is provided, and this cutout portion 5g is normally engaged with a portion of the end portion of the opening/closing member other than the portion where the cutout portion 16d is provided, thereby restricting the turn of the cylindrical rotary member 7 as shown especially in FIG. 6, FIG. 15, and FIG. 17.

Figure 4:
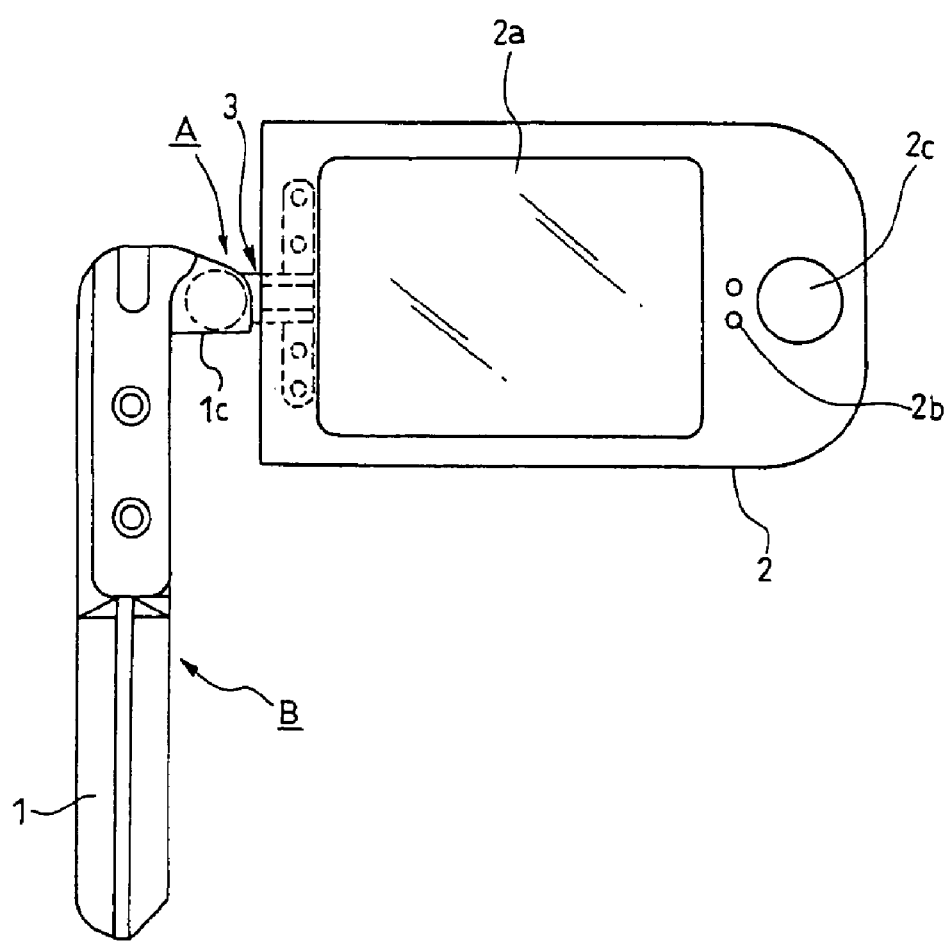
FIG. 4 is a side view showing the state when the second casing is turned after being opened 90° relative to the first casing from the state shown in FIG. 1.
Figure 5:
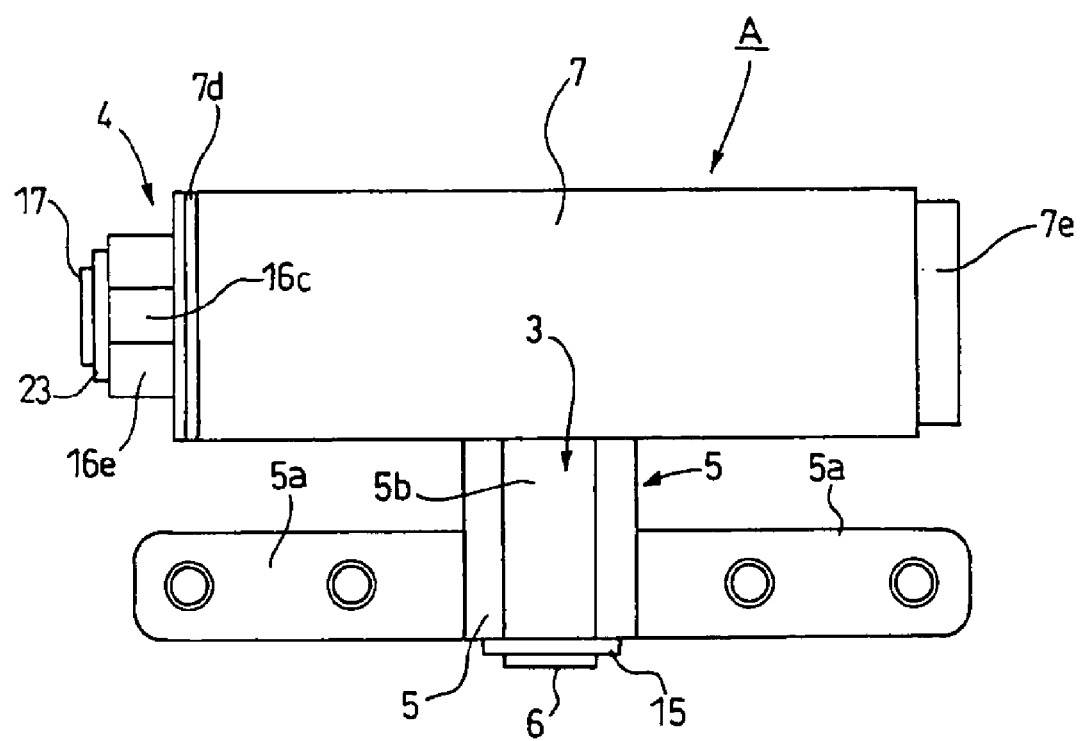
FIG. 5 is a plane view of the hinge for portable terminal according to the present invention.

Here, the mounting pieces 5a, 5a of the fixed member 5 of the rotary hinge module 3 of the hinge A for portable terminal according to the present invention are fixed to the upper face of the upper end of the second casing 2, using the fixing screws 5c, 5c . . . as shown in FIG. 1 and FIG. 4. A mounting portion 16e, which protrudes from one side of the cylindrical rotary member 7, of the opening/closing member 16 of the opening/closing hinge module 4 is coupled to a mounting portion 1c out of mounting portions (1c, 1d) provided at an upper end portion of the first casing 1, utilizing the turn stoppers 16c, and the opening/closing member 16 is coupled to the other mounting portion 1d via a mounting portion 7e of the cylindrical rotary member 7.

Figure 3:
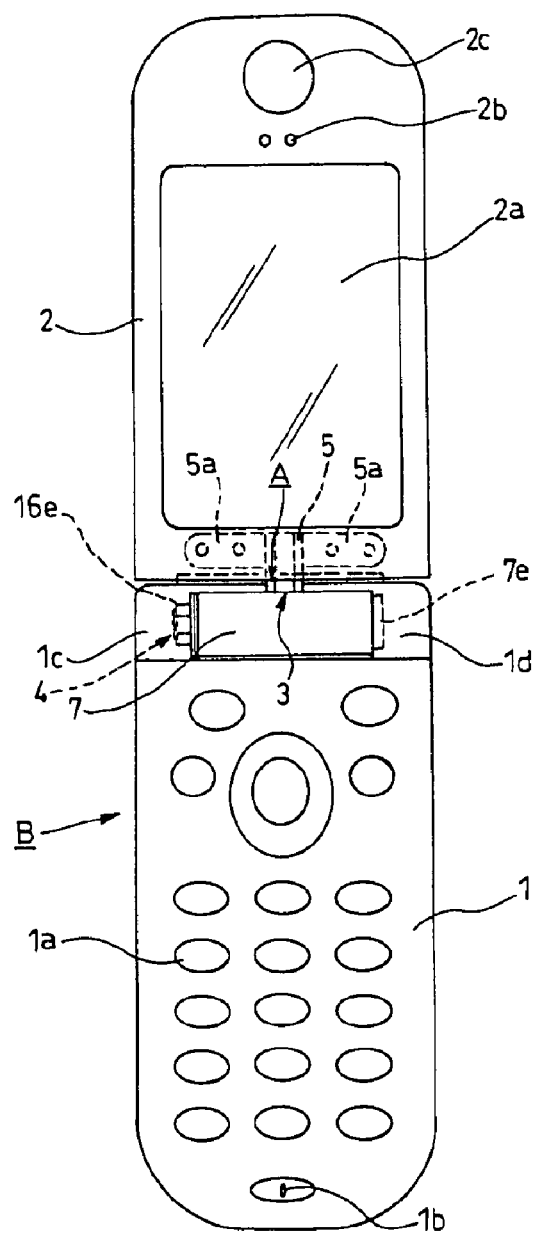
FIG. 3 is a plane view showing the state when the second casing is opened relative to the first casing from the state shown in FIG. 1.
Figure 34:
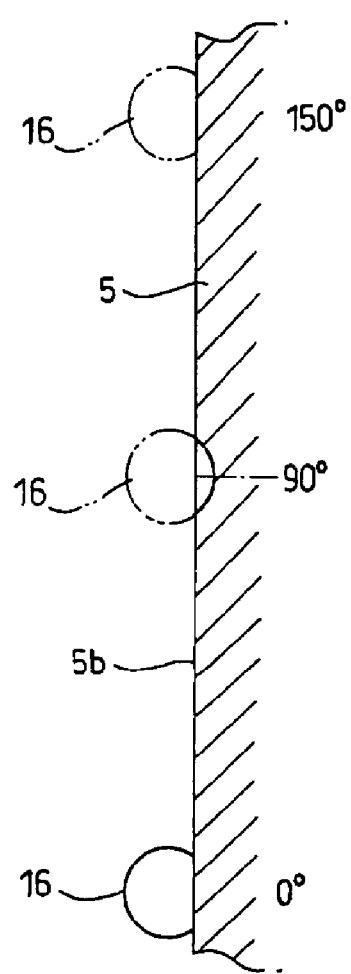
FIG. 34 is an explanatory view to explain the operation of the hinge for portable terminal according to the present invention.

With this structure, even if an attempt is made to turn the second casing 2 in the horizontal direction relative to the first casing 1 while the first casing 1 and the second casing 2 are in the state shown in FIG. 1 and FIG. 3, the second casing 2 does not turn in the horizontal direction relative to the first casing 1 since the end portion of the opening/closing member 16 attached to the cylindrical rotary member 7 is fitted in the cutout portion 5g of the pivotally supporting cylinder 5b of the fixed member 5 when the opening angle is 0° as shown especially in FIG. 9, so that the rotation of the pivotally supporting cylinder 5b is hindered. FIG. 34 is a view to explain this operation.

Figure 35:
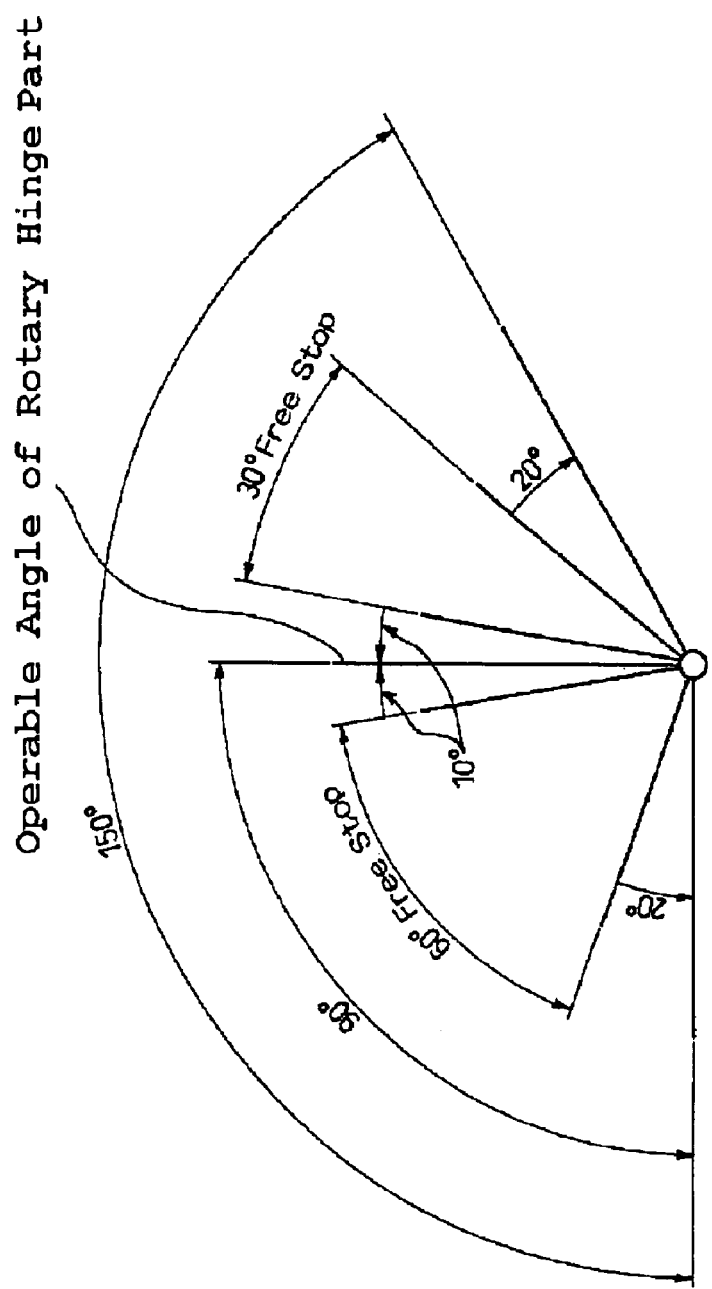
FIG. 35 is an explanatory view to explain the operation of the hinge for portable terminal according to the present invention.

However, the first casing 1 and the second casing 2 are allowed to be opened/closed relative to each other in the vertical direction by the opening/closing hinge module 4. The opening/closing operation by this opening/closing hinge module 4 is performed while being controlled by the respective cam portions 21, 22 of the second cam 18 and the second cam floor 19. In this embodiment, automatic opening/closing is performed by an absorbing function owing to a resilient force of the second resilient means 20 from 20° prior to the maximum opening angle 150° and similarly from 20° prior to the closing angle 0°, and in addition, a free-stop function works between 20° and 130°, depending on facing positions of the protruding portions 21a, 21a/22a, 22a and the recessed portions 21b, 21b/22b, 22b constituting the respective cam portions 21, 22. Specifically, automatic closing or opening is performed when the protruding portions 21a, 21a of the cam portion 21 of the second cam 18 drop in the recessed portions 22b, 22b of the cam portion 22 of the second cam floor 19. The free-stop function works when the protruding portions 21a, 21a of the cam portion 21 of the second cam 18 are in pressure contact with the protruding portions 22a, 22a of the cam portion 22 of the second cam floor 19. FIG. 35 is a view to explain this operation.

As shown in FIG. 35, the second casing 2 turns in the horizontal direction relative to the first casing 1 with respect to the first hinge pin 6 as a fulcrum when the opening angle of the second casing 2 relative to the first casing 1 is in a range of 90 °±10°. In this opening angle range, the cutout portion 16d provided at the end portion of the opening/closing member 16 is positioned on the edge of the upper end of the pivotally supporting cylinder 5b, so that the pivotally supporting cylinder 5b is freely rotatable. This turn angle is controlled in such a manner that the stopper portion 10c provided in the first cam 10 is fitted in the curved guide groove 5f provided in the pivotally supporting cylinder 5b, and is 180° in this embodiment.

The turning state of the cylindrical rotary member 7, namely, the turning state of the second casing 2 relative to the first casing 1 is as shown in FIG. 4, and this turning state enhances operability for picking up a laterally long image of a subject by the camera 2c, and in addition, presents good visibility for viewing a laterally long image displayed on a screen of the display portion 2a.

Incidentally, the whole structure of the first cam mechanism 9 and the second cam mechanism 25, the shapes, mounting positions, and so on of the respective cam portions which are described above can be arbitrarily selected.

Further, the opening/closing hinge module 4 is structured such that the second hinge pin 17 is fixed and the opening/closing member 16 rotates. However, the reverse structure such that the opening/closing member 16 is fixed and the second hinge pin 17 rotates may be adopted. In this case, the mounting portion 1c of the first casing 1 is coupled to the second hinge pin 17, and the opening/closing member serves as the second hinge pin 17.

In this embodiment, it may be possible to omit the opening/closing member 16 and utilize a cylinder portion of the cylindrical rotary member 7. In this case, the cutout portion 5g provided in the opening/closing member 16 and serving as the means for restricting the turn of the rotary hinge module 3 may be provided in this second hinge pin 17.

As has been detailed hitherto, with the rotary hinge module and the opening/closing hinge module that are integrated to have a compact structure, the first casing having the keyboard portion thereon and the second casing having the display portion thereon of the portable terminal are not only foldable via the opening/closing hinge module with the keyboard portion and the display portion facing each other when not in use but also openable/closable. In addition, when they are opened for use, the second casing having the display portion is turned relative to the first casing via the rotary hinge module in a right angle direction to the opening/closing direction when necessary. This allows the use of the display portion both in a vertically long state and in a laterally long state.

What is claimed is:

1. A hinge for portable terminal connected to a first casing having a keyboard portion and a second casing having a display portion, comprising:
   a rotary hinge module configured to provide rotational movement to said first and second casing, and an opening/closing hinge module operatively joined to said rotary hinge module and configured so as to enable said first and second casings to pivotally open and close relative to one another;
   wherein said rotary hinge module comprises:
      a fixed member having a pivotally supporting cylinder and a mounting piece that secures said second casing to said fixed member;
      a first hinge pin having a first deformed head on one end and inserted lengthwise through said pivotally supporting cylinder to rotatably support said fixed member;
      a first cam mechanism mounted on the end of said first hinge pin having said first deformed head and configured to control the movement of said rotary hinge module;
   wherein said opening/closing hinge module comprises:
      an opening/closing member mounted on one cylinder portion of a cylindrical rotary member;
      a second hinge pin having a second deformed head and rotatably inserted into said cylindrical rotary member in a lengthwise direction;
      a second cam mechanism mounted on the end of said second hinge pin having said second deformed head and configured to control the movement of said opening/closing hinge module;
   wherein said first and second hinge pins are attached to one another by a fixing screw at said first and second deformed heads so as to operatively join said rotary and opening/closing hinge module; and
   wherein a first end portion of said pivotally supporting cylinder is abutted against a second end portion of said opening/closing member, said first and second end portions being configured so as to restrict rotation of said pivotally supporting cylinder when said first and second casings are at a first predetermined angle and to permit rotation of said pivotally supporting cylinder when said first and second casings are at a second predetermined angle.

2. The hinge for portable terminal according to claim 1, wherein
   at least one of said first cam mechanism and said second cam mechanism has an absorbing function,
   the absorbing function of said first cam mechanism being a function of automatically turning said pivotally supporting cylinder from a predetermined turn angle, and
   the absorbing function of said second cam mechanism being a function of automatically opening or closing said opening/closing member pivotally from a predetermined opening/closing angle.

3. The hinge for portable terminal according to claim 2, wherein said opening/closing member is a hinge cylinder.

4. The hinge for portable terminal according to claim 2, wherein
   said first deformed head is mounted in a mounting seat provided in said cylindrical rotary member,
   said second deformed head is mounted in a deformed opening of said cylindrical rotary member, and
   said first and second deformed heads are joined by said fixing screw so that said first and second hinge pins form a right angle with each other.

5. The hinge for portable terminal according to claim 2, wherein each of said first cam mechanism and said second cam mechanism is constituted of a cam and a cam floor in which cam portions are formed on respective facing surfaces thereof, one of the cam portions being in pressure contact with the other cam portion.

6. The hinge for portable terminal according to claim 1, wherein said opening/closing member is a hinge cylinder.

7. The hinge for portable terminal according to claim 6, wherein
said first deformed head is mounted in a mounting seat provided in said cylindrical rotary member,
said second deformed head is mounted in a deformed opening of said cylindrical rotary member, and
said first and second deformed heads are joined by said fixing screw so that said first and second hinge pins form a right angle with each other.

8. The hinge for portable terminal according to claim 6, wherein each of said first cam mechanism and said second cam mechanism is constituted of a cam and a cam floor in which cam portions are formed on respective facing surfaces thereof, one of the cam portions being in pressure contact with the other cam portion.

9. The hinge for portable terminal according to claim 1, wherein
said first deformed head is mounted in a mounting seat provided in said cylindrical rotary member,
said second deformed head is mounted in a deformed opening of said cylindrical rotary member, and
said first and second deformed heads are joined by said fixing screw so that said first and second hinge pins form a right angle with each other.

10. The hinge for portable terminal according to claim 9, wherein each of said first cam mechanism and said second cam mechanism is constituted of a cam and a cam floor in which cam portions are formed on respective facing surfaces thereof, one of the cam portions being in pressure contact with the other cam portion.

11. The hinge for portable terminal according to claim 1, wherein each of said first cam mechanism and said second cam mechanism is constituted of a cam and a cam floor in which cam portions are formed on respective facing surfaces thereof, one of the cam portions being in pressure contact with the other cam portion.

* * * * *